US008504042B2

(12) United States Patent
Chien et al.

(10) Patent No.: US 8,504,042 B2
(45) Date of Patent: Aug. 6, 2013

(54) METHOD OF HANDLING SERVICE GROUP OWNERSHIP TRANSFER IN A COMMUNICATION SYSTEM AND RELATED COMMUNICATION DEVICE

(75) Inventors: Ho-Sung Chien, Taoyuan County (TW); Ju-Ting Yang, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/217,229

(22) Filed: Aug. 24, 2011

(65) Prior Publication Data

US 2012/0052863 A1    Mar. 1, 2012

Related U.S. Application Data

(60) Provisional application No. 61/376,685, filed on Aug. 25, 2010, provisional application No. 61/379,398, filed on Sep. 2, 2010.

(51) Int. Cl.
*H04W 4/08* (2009.01)
(52) U.S. Cl.
USPC ............ 455/436; 370/401; 370/338; 709/219
(58) Field of Classification Search
USPC ........ 370/338, 401, 254, 463, 352; 455/41.1, 455/414.3, 436; 709/224, 217, 203, 219, 709/225, 220; 379/230
See application file for complete search history.

(56) References Cited

U.S. PATENT DOCUMENTS

| | | | | |
|---|---|---|---|---|
| 5,535,361 | A | * | 7/1996 | Hirata et al. ................... 711/145 |
| 2004/0068563 | A1 | * | 4/2004 | Ahuja et al. ................... 709/225 |
| 2009/0113027 | A1 | * | 4/2009 | Gomyo et al. ................ 709/220 |
| 2010/0222042 | A1 | * | 9/2010 | Bosan et al. ............... 455/414.3 |
| 2010/0293183 | A1 | * | 11/2010 | Yaqub ........................... 707/769 |
| 2011/0183760 | A1 | * | 7/2011 | Kim et al. ........................ 463/40 |
| 2012/0016987 | A1 | * | 1/2012 | Oda et al. ...................... 709/224 |
| 2012/0072549 | A1 | * | 3/2012 | Deprun .......................... 709/219 |
| 2012/0102161 | A1 | * | 4/2012 | Deprun .......................... 709/220 |
| 2012/0239733 | A1 | * | 9/2012 | Deprun .......................... 709/203 |

FOREIGN PATENT DOCUMENTS

| | | |
|---|---|---|
| JP | 2012503344 A | 2/2012 |
| WO | 2010032535 A1 | 3/2010 |

OTHER PUBLICATIONS

Deprun, Jean-Francois; WO2011007963 , Jan. 20, 2011, Method and Device for Controlling AD-HOC Network in CPNS Enabler, All pages (, PCT/KR10/03917 ).*
Converged Personal Network Service Requirements Candidate Version 1.0—Nov. 17, 2009 Open Mobile Alliance OMA-RD-CPNS-V1_0-20091117-C, Nov. 2009.

(Continued)

*Primary Examiner* — Mahendra Patel
(74) *Attorney, Agent, or Firm* — Winston Hsu; Scott Margo

(57) ABSTRACT

A method of transferring ownership of a service group (SG) for a communication system comprising a server is disclosed. The service group comprises a first plurality of network elements. The method comprises receiving an owner transfer request that is transmitted from a first network element of the service group, wherein the first network element possesses the ownership of the service group; and selecting a second network element from the first plurality of network elements of the service group according to a selection procedure, to transfer the ownership of the service group from the first network element to the second network element; wherein the first network element and the second network element are managed by a first network gateway and a second network gateway of the communication system, respectively.

24 Claims, 4 Drawing Sheets

(56) References Cited

OTHER PUBLICATIONS

European patent application No. 11006961.4, European application filing date: Aug. 25, 2011, European Search Report mailing date: Feb. 8, 2012.
HTC Corporation, "SG Owner Management Service Group Owner Transfer", OMA-CD-CPNS-2010-0244-INP_SG_Owner_Management, Aug. 24, 2010, XP-002662191, Open Mobile Alliance Ltd., p. 1-10.
Open Mobile Alliance, "Converged Personal Network Service Core Technical Specification", Draft Version 1.0—Oct. 25, 2010, OMA-TS-CPNS_Core-V1_0-20101025-D, XP-002662192, cover page+ p. 19-20.
Office Action mailed on Oct. 30, 2012 for the Korean Application No. 10-2011-0085213, filing date Aug. 25, 2011, pp. 1-4.
Warabino et al., Service Group Management Flow, Doc# OMA-CD-CPNS-2010-0184R01-CR, Open Mobile Alliance, Aug. 19, 2010, pp. 1-10.
Office Action mailed on Feb. 12, 2013 for the Japanese Application No. 2011-184028, filing date Aug. 25, 2011, pp. 1-2.
Office action mailed on Oct. 29, 2012 for the European application No. 11006961.4, filing date Aug. 25, 2011, Cover page+ p. 1-5.
Rachelle Yang et al., SG Owner Management Service Group Owner Transfer, OMA-CD-CPNS-2010-0245-CR_SG_Owner_Management Change Request, Open Mobile Alliance, Aug. 25, 2010, p. 1-3.

* cited by examiner

METHOD OF HANDLING SERVICE GROUP OWNERSHIP TRANSFER IN A COMMUNICATION SYSTEM AND RELATED COMMUNICATION DEVICE

CROSS REFERENCE TO RELATED APPLICATIONS

This application claims both the benefit of U.S. Provisional Application No. 61/376,685, filed on Aug. 25, 2010, entitled "Method of Service Group Owner Transfer in CPNS", and the benefit of U.S. Provisional Application No. 61/379,398, filed on Sep. 2, 2010, entitled "Method of Service Group Owner Transfer in CPNS", the contents of which are incorporated herein in their entirety.

BACKGROUND OF THE INVENTION

1. Field of the Invention

The present invention relates to a method used in a communication system and related communication device, and more particularly, to a method of transferring ownership of a service group in a communication system and related communication device.

2. Description of the Prior Art

The Open Mobile Alliance (OMA) is founded to develop OMA specifications for mobile services to meet users' needs. Furthermore, the OMA specifications aim to provide the mobile services which are interoperable across geographic areas (e.g. countries), operators, service providers, networks, operation systems and mobile devices. In detail, the mobile services conforming to the OMA specifications can be used by the users without restriction to particular operators and service providers. The mobile services conforming to the OMA specifications are also bearer agnostic, i.e., the bearer that carries the mobile services can be a second generation (2G) mobile system such as GSM, EDGE or GPRS, or a third generation (3G) and beyond mobile system such as UMTS, LTE or LTE-Advanced. Further, the mobile services can be executed on an operation system such as Windows, Android or Linux operated on various mobile devices. Therefore, industries providing devices or the mobile services supporting the OMA specifications can benefit from a largely growing market enabled by interoperability of the mobile services. Besides, the users use the devices or the mobile services supporting the OMA specifications can also have a better experience due to the interoperability of the mobile services.

Furthermore, Converged Personal Network Services (CPNS) is developed by the OMA to provide application-layer support for ubiquitous access to services in a converged network, which is a group of Personal Networks (PNs) that are interconnected by PN Gateways (PN GWs). In detail, an architecture of the CPNS includes three entities which are a CPNS server, a PN GW, and one or more PN elements (PNEs). The CPNS server receives requests from the PN GW, and replies responses to the PN GW, to ensure that appropriate applications are selected and appropriate contents are provided to the PNEs via the PN GW. The PN GW serves as an intermediary entity between the PNEs and other networks that forwards the requests and the responses between the PNEs and the other networks. The PN GW can be a mobile phone, or an IP-enabled set-top box. Besides, the PNEs are PN entities that are connected to the PN GW and between each other, and are used for rendering the content received from the PN GW or from each other. The PNE can be a mobile phone, a personal computer (PC), a music player, a car navigation system or an IP-enabled set-top box. For example, a PN GW can be a mobile phone which integrates a Bluetooth network and a cellular network. In this situation, a PNE which is a Personal Media Player (PMP) connected to the Bluetooth network can receive video contents from the Internet via the mobile phone connected to the cellular network.

On the other hand, the OMA develops a concept of service group (SG) for the CPNS. The SG is composed of one or more PN GWs and one or more PNEs, which are necessary for the SG to operate normally. The intention of the service group is to group together PNEs which want to receive the same service from a CPNS server or a content provider. In other words, for those PNEs that want to receive a game service can belong to a SG receiving the game service, and for those PNEs that want to receive a music service can belong to a SG receiving the music service. Besides, a PNE creating a SG is assigned as a SG Owner. The SG owner possesses ownership of the SG for managing the SG by inviting a new SG member, expelling a SG member, deleting the SG, etc. Further, a PNE belonging to the SG can leave the SG or abandons to be the owner by sending a SG Leave Request to a corresponding CPNS server via a PN GW managing the PNE. However, when the SG owner leaves the SG or abandons to be the owner, the SG cannot be managed by any other PNEs without the ownership of the SG. The SG will no longer operate normally. Therefore, how to handle the problem when the SG owner intends to leave the SG is a topic to be discussed and addressed.

SUMMARY OF THE INVENTION

The invention therefore provides a method of transferring ownership of a service group to solve the abovementioned problems.

A method of transferring ownership of a service group (SG) for a communication system comprising a server is disclosed. The service group comprises a first plurality of network elements. The method comprises receiving an owner transfer request that is transmitted from a first network element of the service group, wherein the first network element possesses the ownership of the service group; and selecting a second network element from the first plurality of network elements of the service group according to a selection procedure, to transfer the ownership of the service group from the first network element to the second network element; wherein the first network element and the second network element are managed by a first network gateway and a second network gateway of the communication system, respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
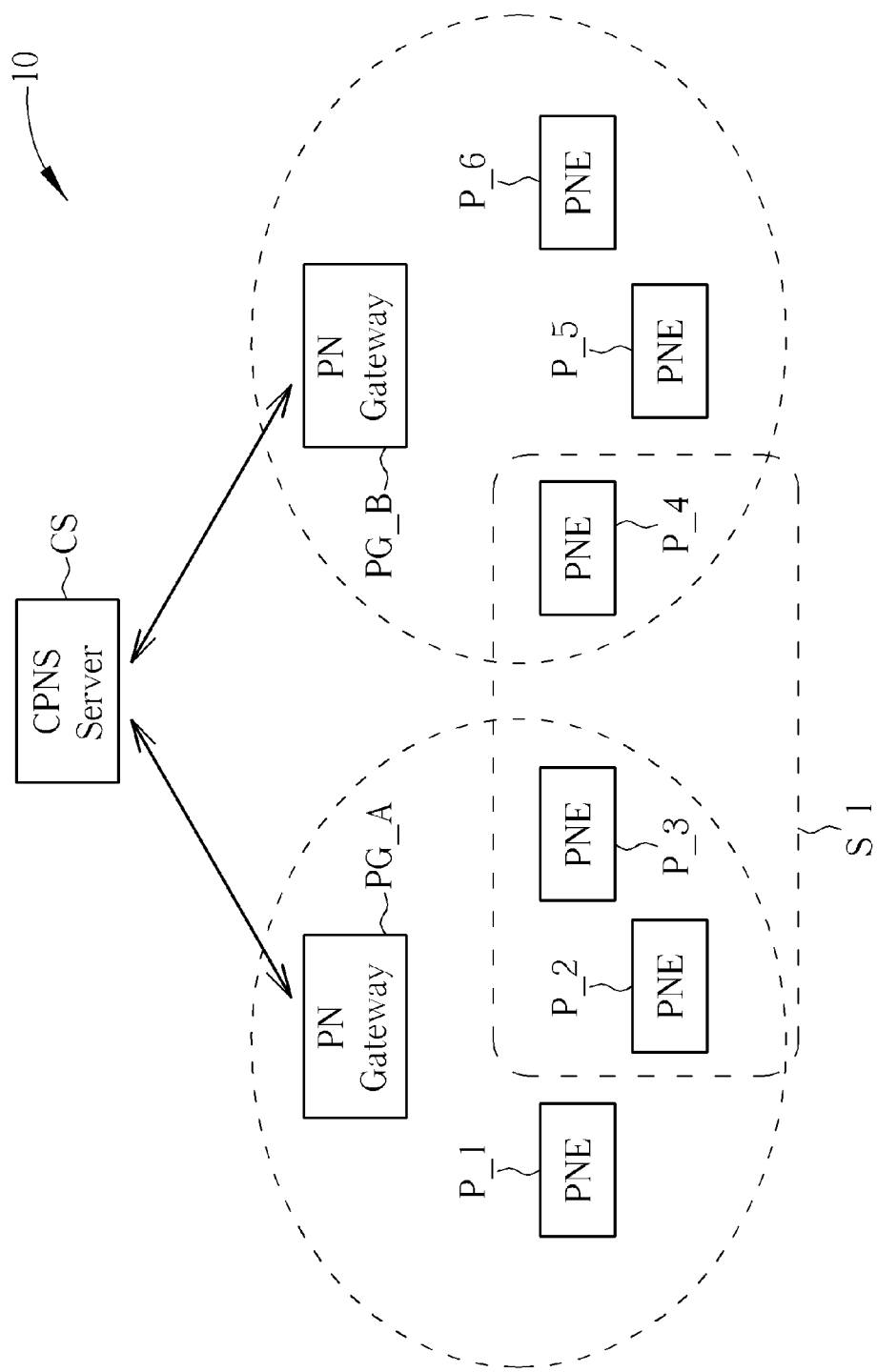
FIG. 1 is a schematic diagram of an exemplary communication system according to the present invention.

Please refer to FIG. 1, which is a schematic diagram of a communication system 10 according to an example of the present invention. The communication system 10 supports Converged Personal Network Services (CPNS) developed by the Open Mobile Alliance (OMA). The communication system 10 is briefly composed of a CPNS server CS, PN gateways (PN GWs) PG_A and PG_B, and PN elements (PNEs) P_1-P_6. In practice, an amount of the PN GWs is not limited to two, and an amount of the PNEs managed by each PN GW is also not limited to three.

In detail, in the communication system 10, the CPNS server CS receives requests from a PN GW, and replies responses to the PN GW, to ensure that appropriate applications are selected and appropriate contents are provided to a PNE managed by the PN GW. A PN GW (e.g. PN GW PG_A or PN GW PG_B) serves as an intermediary entity between the PNE and other networks that forwards the requests and the responses between the PNE and the other networks. In the communication system 10, the PNEs P_1-P_3 are managed by the PN GW PG_A, and the PNEs P_4-P_6 are managed by the PN GW PG_B. In other words, the PN GW PG_A forwards requests, responses and services between the PNEs P_1-P_3 and the CPNS server CS. Similarly, the PN GW PG_B forwards requests, responses and services between the PNEs P_4-P_6 and the CPNS server CS. Preferably, the PN GW can be a mobile phone, or an IP-enabled set-top box. The PNE (e.g. any one of the PNEs P_1-P_6) is a PN entity that is connected to a corresponding PN GW managing the PNE and between each other, and is used for rendering the content received from the corresponding PN GW or from each other. The PNE can be a mobile phone, a personal computer (PC), a music player, a car navigation system or an IP-enabled set-top box. Besides, PNEs P_2-P_4 in the communication system 10 belong to a service group (SG) S_1. Therefore, the PNEs P_2-P_4 can receive the same service (e.g. a game service or a music service) from the CPNS server CS or a content provider. Without loss of generality, the PNE P_2 is assumed as the SG owner of the SG S_1, and possesses ownership of the SG S_1 for managing the SG S_1 by inviting a new SG member, expelling a SG member, deleting the SG S_1, etc.

Figure 2:
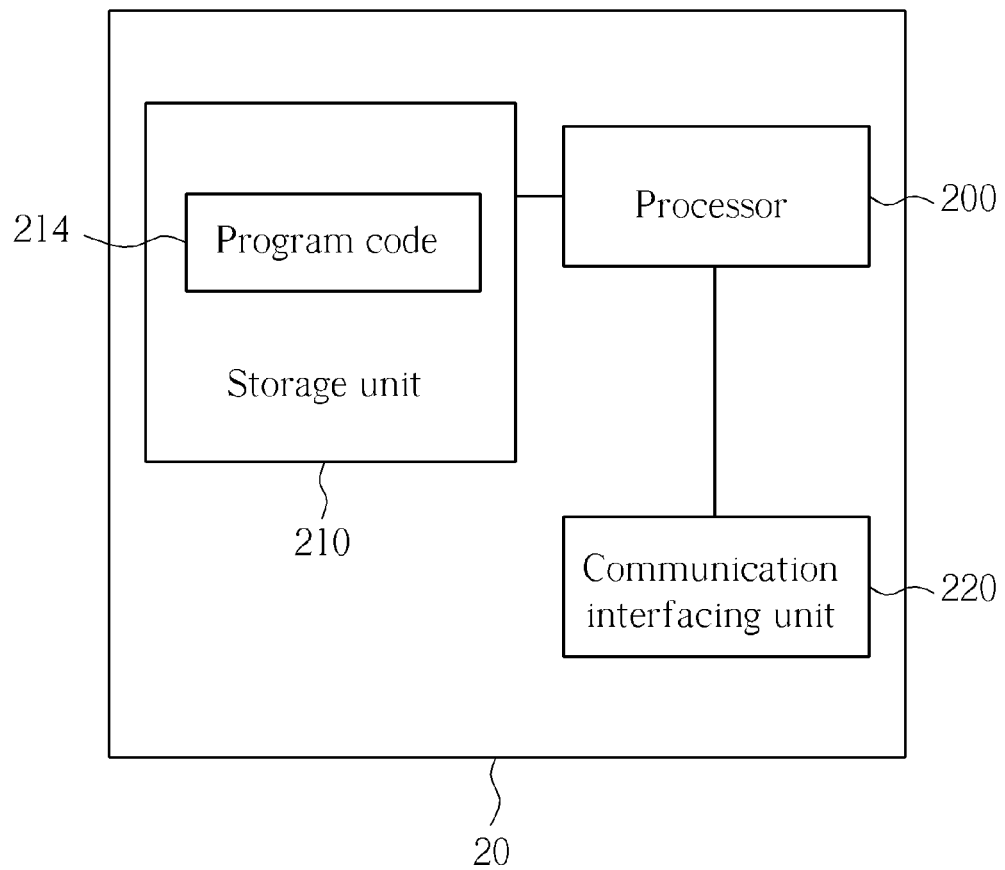
FIG. 2 is a schematic diagram of an exemplary communication device according to the present invention.

Please refer to FIG. 2, which is a schematic diagram of a communication device 20 according to an example of the present invention. The communication device 20 can be any one of the CPNS server CS, the PN GWs PG_A and PG_B, and the PNEs P_1-P_6 shown in FIG. 1, but is not limited herein. The communication device 20 may include a processor 200 such as a microprocessor or Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals with the server according to processing results of the processor 200.

Figure 3:
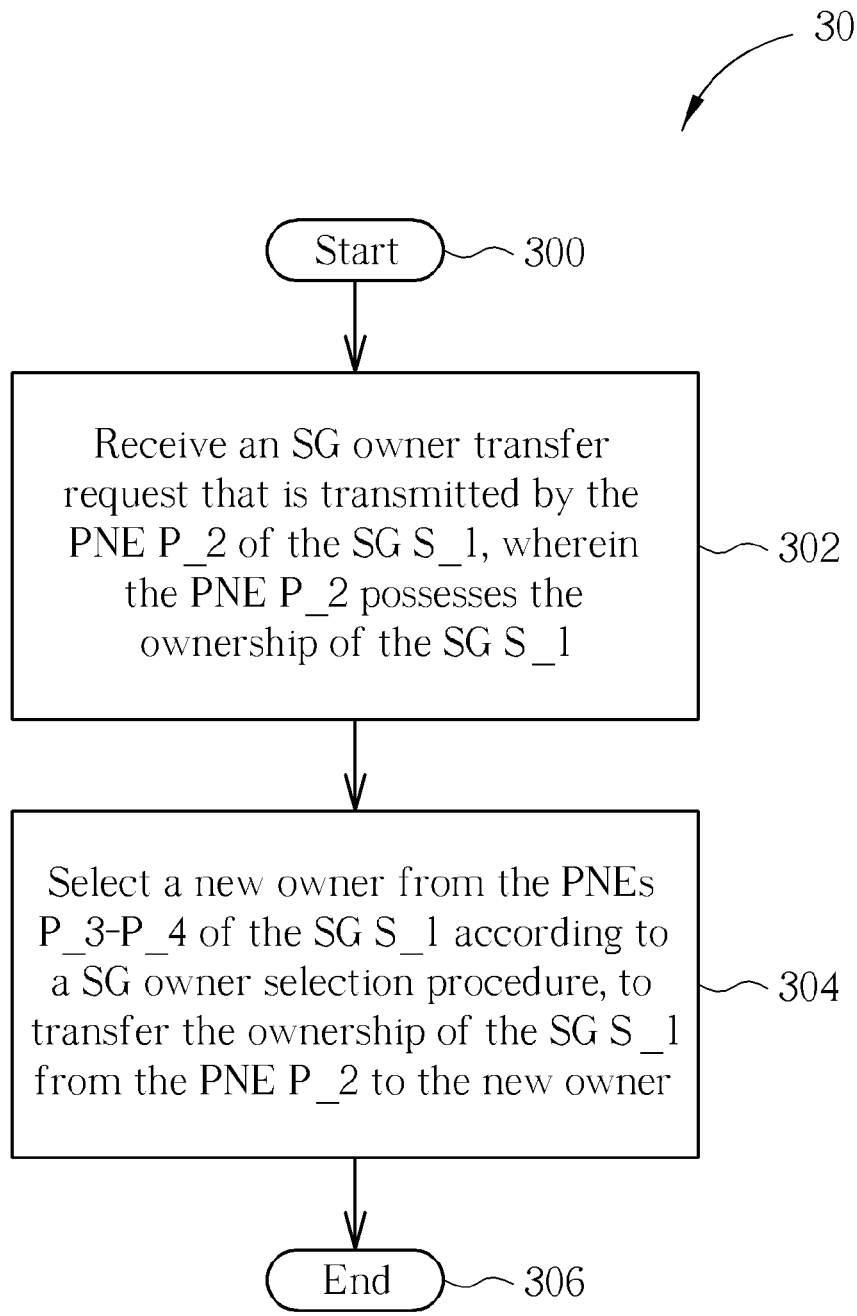
FIG. 3 is a flowchart of an exemplary process according to the present invention.

Please refer to FIG. 3, which is a flowchart of a process 30 according to an example of the present invention. The process 30 is utilized in the communication system 10 shown in FIG. 1, to transfer ownership of the SG S_1 in the communication system 10. The process 30 may be compiled into the program code 214 and includes the following steps:

Step 300: Start.

Step 302: Receive an SG owner transfer request that is transmitted by the PNE P_2 of the SG S_1, wherein the PNE P_2 possesses the ownership of the SG S_1.

Step 304: Select a new owner from the PNEs P_3-P_4 of the SG S_1 according to a SG owner selection procedure, to transfer the ownership of the SG S_1 from the PNE P_2 to the new owner.

Step 306: End.

When the owner of the SG S_1 (which possesses the ownership of the SG S_1), the PNE P_2, intends to leave the SG S_1 or intends no to be the owner of the SG S_1, the PNE P_2 transmits an SG owner transfer request to the CPNS server CS. According to the process 30, after the CPNS server CS receives the SG owner transfer request from the PNE P_2, the CPNS server CS selects the new owner from the PNEs P_3-P_4 of the SG S_1 according to the SG owner selection procedure, to transfer the ownership of the SG S_1 from the PNE P_2 to the new owner. Besides, as the PNE P_2 is managed by the PN GW PG_A, the new owner may be a PNE managed by the PN GW PG_A or the PN GW PG_B according to the selection of the CPNS server CS. Therefore, when the PNE P_2 sends the SG owner transfer request to the CPNS server CS due to that the PNE P_2 intends to leave the SG S_1 or intends no to be the owner of the SG S_1, i.e., abandon the ownership of the SG S_1, the CPNS server CS can select the new owner for the SG S_1 to operate normally.

Figure 4:
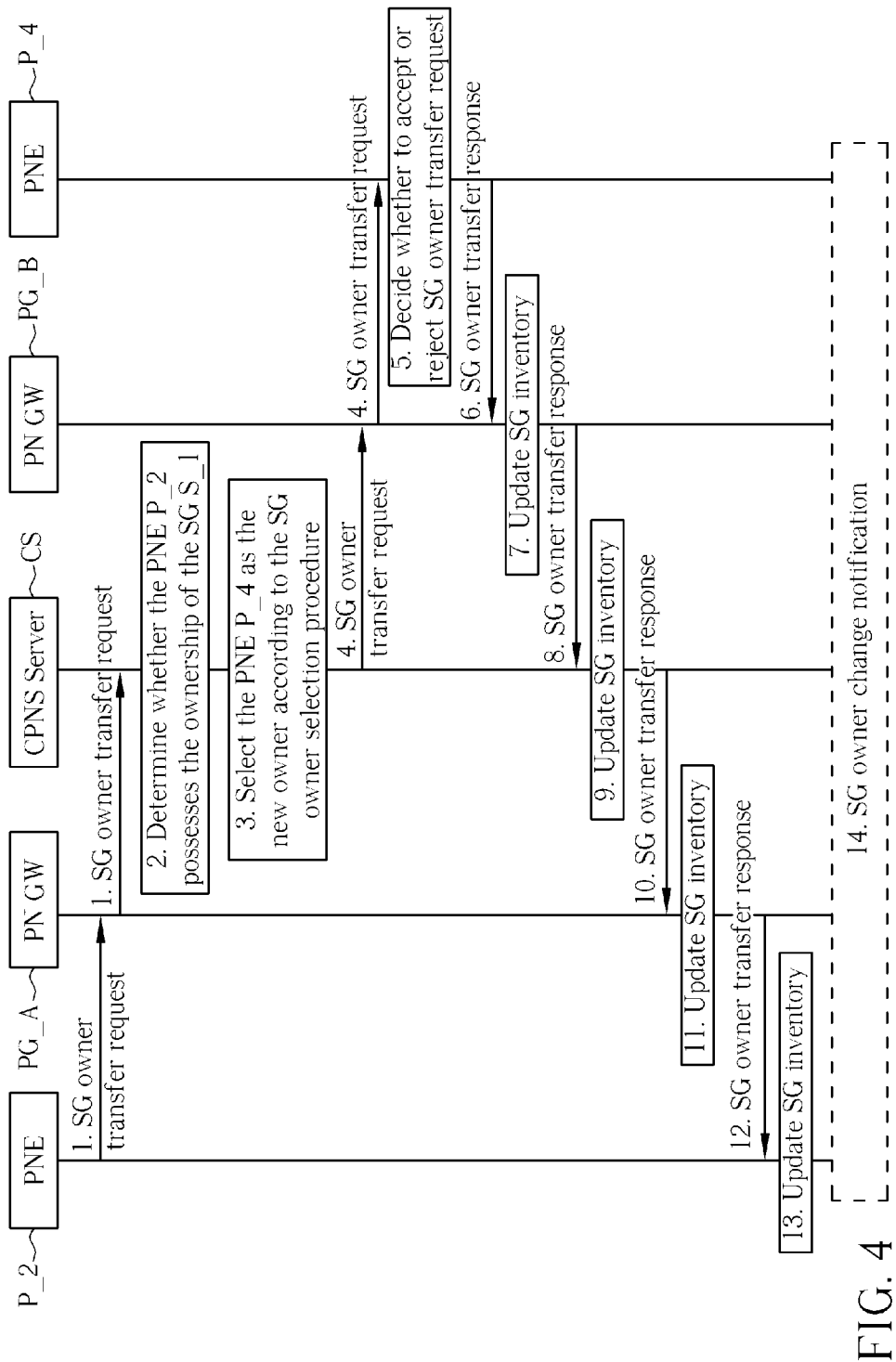
FIG. 4 is a transmission sequence diagram of an exemplary process according to the present invention.

Please note that, the spirit of the present invention is that the CPNS server CS selects the new owner from the PNEs P_3-P_4 of the SG S_1 according to the SG owner selection procedure, when the PNE P_2 intends to abandon the ownership of the SG S_1, wherein signalings and processes occurred between the CPNS server CS, the new owner, the PNE P_2, and related PN GWs are not limited herein. For example, please refer to FIG. 4, which is a transmission sequence diagram of the communication system 10 according to an embodiment of the present invention. FIG. 4 illustrates the signalings and the processes occurred in the communication systems 10 when the PNE P_2 intends to abandon the ownership of the SG S_1.

In detail, when the PNE P_2 intends to abandon the ownership of the SG S_1, the PNE P_2 transmits a SG owner transfer request to the PN GW PG_A which manages the PNE P_2. Then, the PN GW PG_A forwards the SG owner transfer request to the CPNS server CS. After receiving the SG owner transfer request from the PN GW PG_A, the CPNS server CS determines whether the PNE P_2 possesses the ownership of the SG S_1, to avoid that the ownership is transferred accidentally due to a fake request transmitted by a hostile PNE. If the CPNS server CS confirms that the PNE P_2 possesses the ownership of the SG S_1, the CPNS server CS starts to select a new owner from the PNEs P_3-P_4 of the SG S_1 according to a SG owner selection procedure. Without loss of generality, the PNE P_4 is assumed to be selected as the new owner according to the SG owner selection procedure. Then, the CPNS server CS forwards the SG owner transfer request to the PNE P_4 via the PN GW PG_B which manages the PNE P_4.

Further, the PNE P_4 decides whether to accept the ownership of the SG S_1 or not, after receiving the SG owner transfer request. If the PNE P_4 accepts the ownership of the SG S_1, the PNE P_4 transmits a SG owner transfer response to the CPNS server CS to indicate acceptance of the ownership of the SG S_1 via the PN GW PG_B. After confirming the acceptance of the ownership of the SG S_1, the CPNS server CS forwards the SG owner transfer response to the PNE P_2 via the PN GW PG_A, to indicate that the ownership of the SG S_1 has been transferred. Further, the CPNS server CS broadcasts a SG owner change notification in the SG S_1 to notify each PNE of the SG SG_1 that the ownership of the SG S_1 is transferred to the PNE P_4. Therefore, according to the transmission sequence diagram shown in FIG. 4, when the PNE P_2 intends to abandon the ownership of the SG S_1, the new owner is selected such that the SG S_1 can continue to operate normally.

On the other hand, if the PNE P_4 rejects the ownership of the SG S_1, the PNE P_4 transmits a SG owner transfer response to the CPNS server CS to indicate rejection of the ownership of the SG S_1 via the PN GW PG_B. In this situation, the ownership is not transferred, and the PNE P_2 remains the owner of the SG S_1.

Please note that, the SG owner selection procedure is used by the CPNS server CS to select a PNE in the SG S_1 as the new owner, and a criterion used in the SG owner selection procedure may base on capability of a PNE, choice of the CPNS server CS, service description, operator's policy and/ or recommendation of the SG owner (e.g. the PNE P_2), and is not limited herein. For example, the CPNS server CS can select a PNE in the SG S_1 which has the smallest latency from the CPNS server CS as the new owner. A latency of each PNE of the SG S_1 can be obtained by sending a ping to each PNE of the SG S_1. In case there are multiple PNEs having the smallest latency from the CPNS server CS, the CPNS server CS can randomly select a PNE from the multiple PNEs as the new owner. Alternatively, the CPNS server CS can select a PNE in the SG S_1 which was previously assigned as the owner of the SG S_1 most frequently as the new owner. In this situation, the CPNS server CS must have an amount of times that a PNE was assigned as the owner of the SG S_1. In case there are multiple PNEs being previously assigned as the owner of the SG S_1 most frequently, the CPNS server CS can randomly select a PNE from the multiple PNEs as the new owner. Besides, the CPNS server CS can select a PNE in the SG S_1 which stays in the SG S_1 for the longest period as the new owner, since the PNE may not leave the SG S_1 for a certain period. In this situation, the CPNS server CS must have information about how long a PNE stays in the SG S_1. In case there are multiple PNEs staying in the SG S_1 for the longest period, the CPNS server CS can randomly select a PNE from the multiple PNEs as the new owner. Oppositely, the CPNS server CS can also select a PNE in the SG S_1 which stays in the SG S_1 for the shortest period as the new owner, since the PNE may stay in the SG S_1 for a certain period to complete receiving services. In this situation, the CPNS server CS must also have information about how long a PNE stays in the SG S_1. In case there are multiple PNEs staying in the SG S_1 for the shortest period, the CPNS server CS can randomly select a PNE from the multiple PNEs as the new owner. In short, any criterion can be used in the SG owner selection procedure as long as the criterion is suitable for the SG S_1.

On the other hand, for the communication system 10 to operate normally, entities related to operation of the SG S_1 such as the CPNS server CS, the PN GWs PG_A and PG_B and the PNEs P_2-P_4, should maintain their SG inventories corresponding to the SG S_1 locally. In other words, the entities should maintain their SG inventories to record related information, such as the owner of the SG S_1. Therefore, when a PNE leaves/joins the SG S_1, or the owner of the SG S_1 is changed, the entities updates their SG inventories accordingly. For example, the CPNS server CS, the PN GWs PG_A and PG_B, and the PNE P_4 update their SG inventories after receiving the SG owner transfer response indicating the acceptance of the ownership of the PNE P_4, as shown in the transmission sequence diagram in FIG. 4. In short, the entities related to the SG S_1 update their SG inventories when the ownership is transferred. The methods according to which the entities confirm that the ownership is transferred are not limited herein. As known to those skilled in the art, a SG inventory is a list of SG(s) and the information of SGs which includes information of group members therein.

Please note that, the PNE P_2 and the PNE P_4 belong to different PN GWs in the above illustration. However, it may happen that the CPNS server CS selects the PNE P_3 as the new owner according to the SG owner selection procedure, i.e., the owner and the new owner belong to the same PN GW. In this situation, the process 30 directly applies. Further, those skilled in the art can accordingly obtain a corresponding transmission sequence diagram similar to that in FIG. 4, e.g., modify the transmission sequence diagram in FIG. 4 by replacing the PN GW PG_B and the PNE P_4 with the PN GW PG_A and the PNE P_3, respectively, to obtain the corresponding transmission sequence diagram.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention discloses a method of transferring ownership of a SG in a communication system and related communication device. A CPNS server will select a new owner according to the method, when the owner of the SG intends to leave the SG or intends no to be the owner of the SG. Since the new owner is selected according to the present invention if above situations occur, the SG can continue to operate normally.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transferring ownership of a service group (SG) for a communication system comprising a converged personal network service (CPNS) server, the service group comprising a first plurality of personal network elements (PNEs), the method comprising:
   the CPNS server receiving an owner transfer request from a first PNE of the service group;
   the CPNS server selecting a second PNE from the first plurality of PNEs of the service group, to transfer the ownership of the service group from the first PNE to the second PNE; and
   the CPNS server receiving an owner transfer response from the second PNE, wherein the owner transfer response indicates acceptance of the owner transfer request;
   wherein the first PNE and the second PNE are managed by a first personal network gateway and a second personal network gateway of the communication system, respectively.

2. The method of claim 1, wherein the CPNS server receives the owner transfer request via the first personal network gateway.

3. The method of claim 1 further comprising:
   the CPNS server determining whether the first PNE possesses the ownership of the service group, after the owner transfer request has been received.

4. The method of claim 1 further comprising:
transmitting the owner transfer request from the CPNS server to the second PNE, after selecting the second PNE from the first plurality of PNEs of the service group.

5. The method of claim 4, wherein transmitting the owner transfer request from the CPNS server to the second PNE comprises:
transmitting the owner transfer request from the CPNS server to the second PNE via the second personal network gateway.

6. The method of claim 1, wherein the CPNS server receiving the owner transfer response from the second PNE comprises: the CPNS server receiving the owner transfer response from the second PNE via the second personal network gateway.

7. The method of claim 1 further comprising:
transmitting the owner transfer response from the CPNS server to the first PNE.

8. The method of claim 7, wherein transmitting the owner transfer response from the CPNS server to the first PNE comprises:
transmitting the owner transfer response from the CPNS server to the first PNE via the first personal network gateway.

9. The method of claim 1 further comprising:
notifying the first PNE and the first plurality of PNEs that the second PNE possesses the ownership of the service group.

10. The method of claim 1, wherein the CPNS server updates a service group inventory locally to indicate that the second PNE possesses the ownership of the service group.

11. The method of claim 1, wherein the first personal network gateway and the second personal network gateway update a first service group inventory and a second service group inventory locally, respectively, to indicate that the second PNE possesses the ownership of the service group.

12. The method of claim 1, wherein the first PNE updates a service group inventory locally, to indicate that the second PNE possesses the ownership of the service group.

13. The method of claim 4 further comprising:
transmitting an owner transfer response from the second PNE to the CPNS server, wherein the owner transfer response indicates rejection of the owner transfer request.

14. The method of claim 1, wherein the CPNS server selects the second PNE which has the smallest latency from the CPNS server.

15. The method of claim 14, wherein the CPNS server selects the second PNE randomly from a second plurality of PNEs of the service group, when the second plurality of PNEs have the smallest latency from the CPNS server.

16. The method of claim 1, wherein the CPNS server selects the second PNE which was previously assigned as the owner of the service group most frequently.

17. The method of claim 16, wherein the CPNS server selects the second PNE randomly from a second plurality of PNEs of the service group, when the second plurality of PNEs were previously assigned as the owner of the service group most frequently.

18. The method of claim 1, wherein the CPNS server selects the second PNE which stays in the service group for the longest period than any other PNEs in the service group.

19. The method of claim 18, wherein the CPNS server selects the second PNE randomly from a second plurality of PNEs of the service group, when the second plurality of PNEs stay in the service group for the longest period than any other PNEs in the service group.

20. The method of claim 1, wherein the CPNS server selects the second PNE which stays in the service group for the shortest period than any other PNEs in the service group.

21. The method of claim 20, wherein the CPNS server selects the second PNE randomly from a second plurality of PNEs of the service group, when the second plurality of PNEs stay in the service group for the shortest period than any other PNEs in the service group.

22. The method of claim 1, wherein the second PNE is selected according to at least one of capability of the second PNE, the CPNS server's choice, service description, and recommendation of the first PNE which is an owner of the service group.

23. The method of claim 1, wherein the first PNE transmits the owner transfer request to the CPNS server, when the first PNE intends to leave the service group or intends no to be the owner of the service group.

24. The method of claim 1, wherein the first personal network gateway and the second personal network gateway are the same personal network gateway or different personal network gateways.

* * * * *